US011415008B2

(12) United States Patent
Backhouse et al.

(10) Patent No.: US 11,415,008 B2
(45) Date of Patent: Aug. 16, 2022

(54) VANE

(71) Applicant: ROLLS-ROYCE plc, London (GB)

(72) Inventors: Robert C. Backhouse, Wells (GB); Christopher D. Jones, Bristol (GB)

(73) Assignee: Rolls-Royce plc

( * ) Notice: Subject to any disclaimer, the term of this patent is extended or adjusted under 35 U.S.C. 154(b) by 72 days.

(21) Appl. No.: 17/021,435

(22) Filed: Sep. 15, 2020

(65) Prior Publication Data
US 2021/0079798 A1    Mar. 18, 2021

(30) Foreign Application Priority Data

Sep. 17, 2019 (GB) ...................... 1913394

(51) Int. Cl.
*F01D 5/18* (2006.01)
*F01D 9/04* (2006.01)
(Continued)

(52) U.S. Cl.
CPC ............... *F01D 9/041* (2013.01); *F01D 5/18* (2013.01); *F02C 7/06* (2013.01); *F02C 7/36* (2013.01);
(Continued)

(58) Field of Classification Search
CPC . F01D 5/282; F01D 5/18; F01D 5/147; F02C 7/32; F02C 7/36; F05D 2300/6034
See application file for complete search history.

(56) References Cited

U.S. PATENT DOCUMENTS

| 3,532,438 A | 10/1970 | Palfreyman et al. |
| 5,686,038 A | 11/1997 | Christensen et al. |
| (Continued) | | |

FOREIGN PATENT DOCUMENTS

| CN | 110341212 | 10/2019 |
| EP | 0446851 | 9/1991 |
| (Continued) | | |

OTHER PUBLICATIONS

Great Britain search report dated Feb. 27, 2020, issued in GB Patent Application No. 1913392.5.
(Continued)

*Primary Examiner* — Todd E Manahan
*Assistant Examiner* — Thuyhang N Nguyen
(74) *Attorney, Agent, or Firm* — Barnes & Thornburg LLP

(57) ABSTRACT

There is disclosed a vane for a gas turbine engine, the vane comprising a three-dimensional weave of composite material. The vane is hollow to define a hollow core, wherein the vane has a maximum thickness (T), and a maximum wall thickness ($W_T$) between an inner surface and an outer surface in a direction normal to the outer surface, wherein $W_T \leq 0.1T$. Also disclosed is a method of manufacturing a composite vane for a gas turbine engine, the method comprising: forming a preform for the vane comprising a three-dimensional weave of composite material; and curing the preform. The preform has an internal hollow region, and the cured vane has a maximum thickness (T), and a maximum wall thickness ($W_T$) between an inner surface and an outer surface in a direction normal to the outer surface, wherein $W_T \leq 0.1T$.

19 Claims, 10 Drawing Sheets

(51) Int. Cl.
*F02C 7/06* (2006.01)
*F02C 7/36* (2006.01)

(52) U.S. Cl.
CPC ...... *F05D 2220/32* (2013.01); *F05D 2230/21* (2013.01); *F05D 2240/12* (2013.01); *F05D 2300/603* (2013.01)

(56) References Cited

U.S. PATENT DOCUMENTS

| | | | |
|---|---|---|---|
| 6,196,794 B1 | 3/2001 | Matsumoto | |
| 6,413,074 B1 | 7/2002 | Hays | |
| 8,038,408 B2* | 10/2011 | McMillan | F01D 5/147 416/230 |
| 9,617,858 B2* | 4/2017 | Dambrine | B29C 70/24 |
| 10,094,224 B2* | 10/2018 | Murooka | F01D 5/282 |
| 10,408,060 B2* | 9/2019 | Godichon | F03D 1/0683 |
| 2007/0128031 A1* | 6/2007 | Liang | F01D 5/187 416/97 R |
| 2009/0014926 A1 | 1/2009 | Marini | |
| 2010/0322763 A1 | 12/2010 | Penalver Castro et al. | |
| 2012/0100006 A1* | 4/2012 | Merriman | F04D 29/324 416/243 |
| 2013/0156594 A1 | 6/2013 | Kray et al. | |
| 2015/0226071 A1 | 8/2015 | Marshall et al. | |
| 2015/0337664 A1* | 11/2015 | Cosi | F01D 9/02 415/208.1 |
| 2015/0354597 A1 | 12/2015 | I | |
| 2016/0146112 A1* | 5/2016 | Van der Merwe | F02C 7/32 475/331 |
| 2016/0222790 A1* | 8/2016 | Spangler | F01D 5/187 |
| 2016/0245103 A1 | 8/2016 | Gimat et al. | |
| 2016/0312626 A1* | 10/2016 | Schetzel | F01D 5/225 |
| 2017/0361512 A1 | 12/2017 | Plante et al. | |
| 2018/0163552 A1 | 6/2018 | Reynolds et al. | |
| 2019/0145264 A1* | 5/2019 | Jonnalagadda | F01D 9/041 415/115 |

FOREIGN PATENT DOCUMENTS

| | | |
|---|---|---|
| EP | 1215183 | 6/2002 |
| EP | 2105579 A2 | 9/2009 |
| EP | 2572825 | 3/2013 |
| EP | 2706240 | 3/2014 |
| EP | 3081760 A1 | 10/2016 |
| EP | 3564498 | 6/2019 |
| GB | 1170592 | 11/1969 |
| JP | 201199346 | 5/2011 |
| JP | 2017207016 A | 11/2017 |
| WO | 2010130879 | 11/2010 |
| WO | 2012153039 A1 | 11/2012 |
| WO | 2013133875 | 9/2013 |
| WO | 2015041963 A1 | 3/2015 |

OTHER PUBLICATIONS

Great Britain search report dated Mar. 5, 2020, issued in GB Patent Application No. 1913393.3.
Great Britain search report dated Feb. 19, 2020, issued in GB Patent Application No. 1913394.1.
European search report dated Jan. 22, 2021, issued in EP Patent Application No. EP20192320.
European search report dated Jan. 15, 2021, issued in EP Patent Application No. EP20192316.
European search report dated Jan. 19, 2021, issued in EP Patent Application No. EP20192319.

* cited by examiner

SECTION A-A

VANE

CROSS-REFERENCE TO RELATED APPLICATIONS

This specification is based upon and claims the benefit of priority from UK Patent Application Number 1913394.1 filed on 17 Sep. 2019, the entire contents of which are incorporated herein by reference.

BACKGROUND

Technical Field

The present disclosure relates to a vane for a gas turbine engine and a method of manufacturing a composite vane for a gas turbine engine.

Description of the Related Art

Structural vanes, such as those used in stator vane rings of gas turbine engines are typically metallic components. These vanes are typically heavy, which impacts fuel efficiency of the engine. It is therefore desirable to provide an improved arrangement.

SUMMARY

According to a first aspect there is provided a vane for a gas turbine engine, the vane comprising a three-dimensional weave of composite material, wherein the vane is hollow to define a hollow core, and wherein the vane has a maximum thickness T, and a maximum wall thickness $W_T$ between an inner surface and an outer surface in a direction normal to the outer surface, wherein $W_T \leq 0.1T$. The vane may be for use in any engine cartwheel structure, in particular any structure through which oil, hydraulic or electrical services may pass, such as stator vane rings, outlet guide vane structures, intermediate casings or front frame (fan inlet) structures. The vane may be a structural vane. The vane may be for use in a structural stator vane ring for a core inlet, a bypass duct, or an air intake. The use of a three-dimensional weave of composite material enables a hollow vane to be manufactured which has mechanical properties suitable for use in a structural application, whilst also being lighter in weight. A lighter vane may improve the fuel efficiency of a gas turbine engine.

The wall thickness $W_T$ may be substantially the same around the entire hollow region. The wall thickness $W_T$ may vary with the specific position around the hollow region. $W_T$ may be greater than or equal to 0.05T. For example, the vane may have a maximum thickness T of 40 mm wall thickness $W_T$ of at least 2.8 mm, giving a value of $W_T=0.07T$. It will be appreciated that vane thickness T depends on the application of any particular gas turbine engine.

The three-dimensional weave may comprise warp fibres which extend along a spanwise direction of the vane, and weft fibres which extend along a circumferential direction around the hollow core (e.g. circumferentially around a spanwise axis of the vane disposed within the hollow core), and wherein the ratio of warp to weft fibres is greater than 50:50. The ratio of warp to weft fibres is intended to mean the ratio of the total mass of the warp fibres to the total mass of the weft fibres. The ratio of warp to weft fibres may be greater than 55:45, greater than 60:40, greater than 65:35, or greater than 70:30. By increasing the ratio of warp to weft fibres, the mechanical properties of the vane along the warp direction can be improved.

The three-dimensional weave may comprise warp fibres which extend along a direction that is within 5 degrees of the spanwise direction of the vane. The weft fibres may extend along a direction having a circumferential component around the hollow core. The weft fibres may extend along a direction which is orthogonal within the respective layer with respect to the warp fibres.

The circumferential direction relates to a polar frame of reference about a spanwise axis through the hollow core. It will be appreciated that in the context of an airfoil (rather than a cylinder, for example) the circumferential component is aligned with the wall of the airfoil rather than being orthogonal to the radius at all points. The fibres may extend between the leading edge and the trailing edge of the vane. The warp fibres are those fibres which are held in tension during the weaving of the three-dimensional structure. The weft fibres are woven between the warp fibres. The three-dimensional weave may also comprise z-binder fibres, which may be woven in a through-thickness direction of the warp and weft fibres. The z-binder fibres may impart improved through-thickness toughness properties to the three-dimensional weave.

The hollow core may define a plurality of hollow core regions which are separated by webbing (also known as baffles or stiffeners). The webbing divides the hollow core of the vane into a plurality of regions. The webbing may improve the stiffness of the vane. The webbing may be formed by a plurality of layers of three-dimensionally woven composite material. There may be a single region of webbing, forming two hollow core regions, or a plurality of regions of webbing. In use, the hollow core or each of hollow core regions may be empty, may be filled with a damping material or contain a hollow rod. Each of the hollow core regions may be used to supply different services.

The vane may comprise a damping material within the hollow core. The damping material may be any suitable viscoelastic damping material. The damping material may comprise a material with an elastic modulus between 0.5 and 100 N/mm². The damping material may dampen vibration of the vane.

A metal or carbon fibre composite rod may be provided within the hollow core. The vane may comprise a connector for connection to an oil line to provide oil to the hollow core. The rod may be solid or hollow. The rod may improve stiffness locally in the vanes. The rod may be provided at a specific angle to a spanwise axis in order to provide stiffness in a desired direction. A hollow rod may be used as a channel for fluid or electrical wiring.

The vane may comprise an oil line configured to convey oil, the oil line being coupled to the connector to provide oil to the hollow core.

The composite material may comprise a carbon fibre reinforcement material. The composite material may comprise an organic polymer matrix, a ceramic matrix or a metal matrix. The carbon fibres may comprise intermediate modulus and high strength fibres. The composite material may comprise a silicon carbide/silicon carbide composite or aluminium oxide/aluminium oxide composite.

The vane may comprise an inner region and an outer region, wherein at least one weave parameter differs between the inner region and the outer region, wherein the difference is in a weave parameter selected from the group consisting of: weave dimensionality, namely two dimensional or three dimensional; three-dimensional weave architecture (such as layer-to-layer weaving, or through thickness angle interlock); a length of the fibres; a ratio of warp to weft fibres; and an angle of the warp fibres to a spanwise axis of the vane. The ratio of warp to weft fibres is intended to mean the ratio of the total mass of the warp fibres to the total mass of the weft fibres. By changing the angle of the warp fibres to a spanwise axis of the vane, the frequency response properties of the vane can be tuned.

According to a second aspect there is provided a vane arrangement for a gas turbine engine comprising an oil line configured to convey oil; and a vane in accordance with the first aspect, the oil line being coupled to the connector to provide oil to the hollow core.

According to a third aspect there is provided a fibre reinforced composite stator vane ring for a core inlet, a bypass duct, or an air intake of a gas turbine engine, comprising a plurality of vanes in accordance with the first aspect, or a plurality of vane arrangements in accordance with the second aspect.

The stator vane ring may be a structural stator vane ring. The term "structural" is intended to mean that the stator vane ring is configured to transfer structural loads (e.g. torque and lateral loads) between the components to which it is attached, for example across the core annulus between a core body of the core engine to the core fairing, or across the bypass duct between the core fairing and a fan casing, or to transfer loads across an air intake between a fan axis and the fan casing. This is in contrast to stator vane rings which are configured to withstand aerodynamic loads, but are not configured to transfer significant structural loads.

The structural stator vane ring may therefore be, for example, an outlet guide vane (OGV) ring disposed at an upstream end of the bypass duct of a gas turbine engine, an outer ring of an intermediate case disposed in the bypass duct downstream of the outlet guide vane ring, an engine stator section (ESS) ring disposed in a core inlet of the engine core, or a front frame disposed upstream of a fan.

The definition of a stator vane ring as disposed "in the core inlet", or the core inlet comprising the stator vane ring/vane means that the stator vane ring/vane is the most upstream component disposed in and radially traversing the annular flow path through the engine core (which commences downstream of the fan at the lip of the core fairing). As will be appreciated by those skilled in the art, the stator vane ring in this location provides a structural load path between the core body (e.g. support structures such as a front bearing housing supporting one or more shafts of the engine) and the core fairing, which load path extends through the outlet guide vanes to the fan casing and pylon.

The disclosure herein relates to stator vane rings which are configured to withstand the structural loads (e.g. torque and lateral loads) applied at the respective locations as described above. By manufacturing the stator vane ring according to the methods disclosed herein, a lightweight stator vane ring can be provided using composite materials which nevertheless is sufficiently strong to withstand the structural loads at this location of the engine. In contrast, downstream stator vanes provided between successive rotor stages are generally configured to withstand aerodynamic loads, but are not configured to transfer significant structural loads across the core annulus.

According to a fourth aspect there is provided a gas turbine engine for an aircraft comprising: an engine comprising a turbine, a compressor, and a core shaft connecting the turbine to the compressor; a fan located upstream of the engine core, the fan comprising a plurality of fan blades; and wherein a core inlet, a bypass duct or an air intake of the gas turbine engine comprises one or more vanes, vane arrangements or stator vane rings in accordance with the first, second and/or third aspects.

The gas turbine engine may comprise an engine core defining an annular flow path for a core gas flow between a core body and a core fairing, the engine core comprising the core inlet between the core body and the core fairing, wherein the stator vane ring is disposed in the core inlet and serves as a structural support for transferring loads between the core body and the core fairing.

It may be that the gas turbine engine further comprises: a gearbox that receives an input from the core shaft; wherein the gearbox receives input from the core shaft and outputs drive to the fan so as to drive the fan at a lower rotational speed than the core shaft; wherein the gearbox is an epicyclic gearbox, and wherein an annulus or ring gear of the epicyclic gearbox is structurally supported by coupling to the stator vane ring.

According to a fifth aspect, there is provided a method of manufacturing a composite vane for a gas turbine engine, the method comprising: forming a preform for the vane comprising a three-dimensional weave of composite material; and curing the preform; wherein the preform has a hollow core, and wherein the cured vane has a maximum thickness T, and a maximum wall thickness $W_T$ between an inner surface and an outer surface in a direction normal to the outer surface, wherein $W_T \leq 0.1T$.

The wall thickness may be substantially the same around the entire hollow region. The wall thickness may vary with the specific position around the hollow region. $W_T$ may be greater than 0.05T. The vane may have a maximum thickness T of 35 mm or less. The vane may have a wall thickness $W_T$ of at least 2.4 mm, giving a value of $W_T=0.069T$.

The step of forming a preform may comprise three-dimensionally weaving the fibre reinforcement material, followed by forming the fibre reinforcement material into a desired shape.

The preform may be formed around a core mandrel, and the core mandrel may be removed after curing of the preform, so as to form the hollow core.

The method may further comprise a damping medium being introduced into the hollow core.

The preform may comprise an inner region and an outer region, wherein at least one weave parameter differs between the inner region and the outer region, wherein the difference is in a weave parameter selected from the group consisting of: weave dimensionality, namely two dimensional or three-dimensional; three-dimensional weave architecture (such as layer-to-layer weaving, or through thickness angle interlock); a length of the fibres; a ratio of warp to weft fibres; and an angle of the warp fibres to a spanwise axis of the vane. The ratio of warp to weft fibres is intended to mean the ratio of the total mass of the warp fibres to the total mass of the weft fibres.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}$ s to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
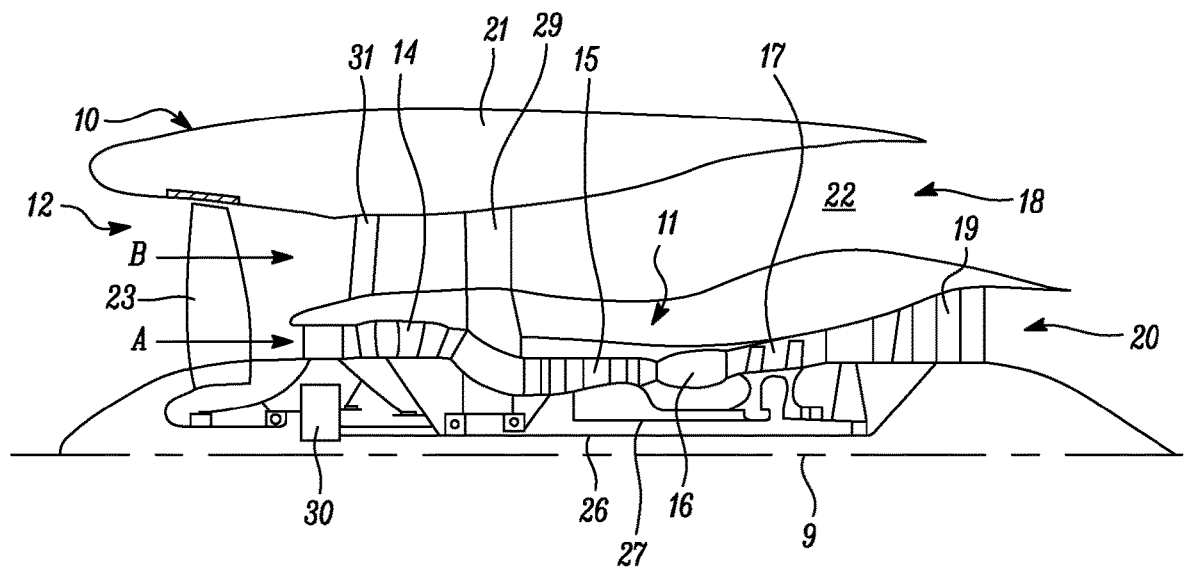
FIG. 1 is a sectional side view of a first example gas turbine engine.

FIG. 1 illustrates a first example gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. An outlet guide vane ring 31 is disposed in the bypass duct 22, at an upstream end of the bypass duct 22. An intermediate case 29 is disposed downstream of the outlet guide vane ring 31, and comprises an outer stator vane ring and an inner stator vane ring. The outer stator vane ring is disposed within the bypass duct 22 and the inner stator vane ring of the intermediate case is disposed within the engine core 11. The outlet guide vane ring 31 and the outer stator vane ring of the intermediate case 29 are configured to transfer loads from the engine core 11 to the nacelle 21.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
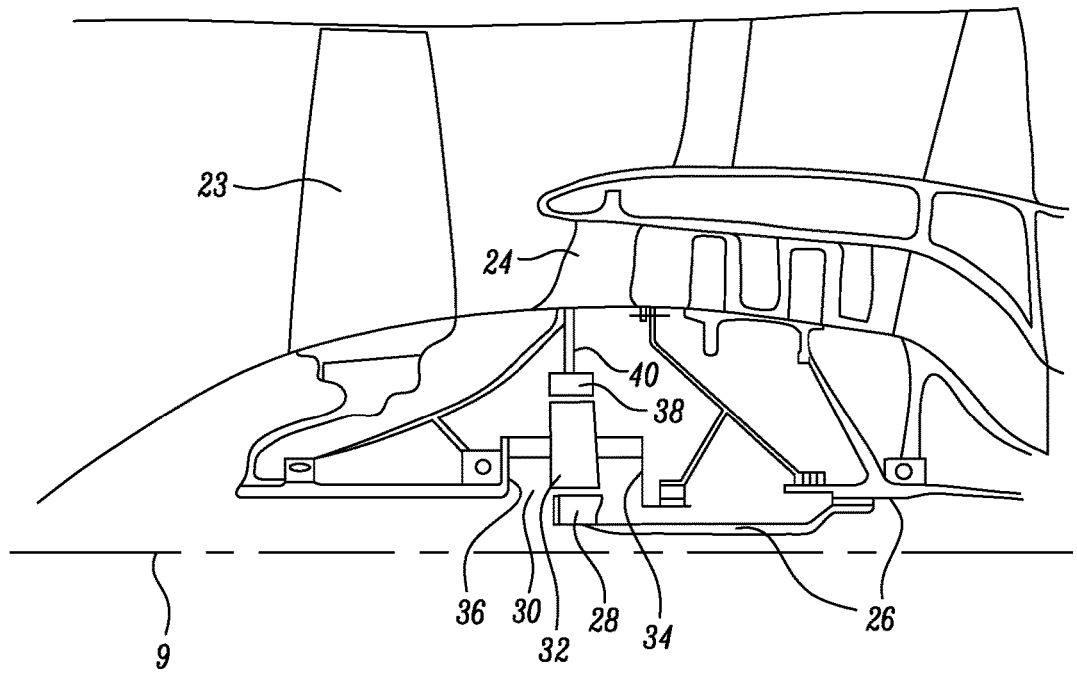
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
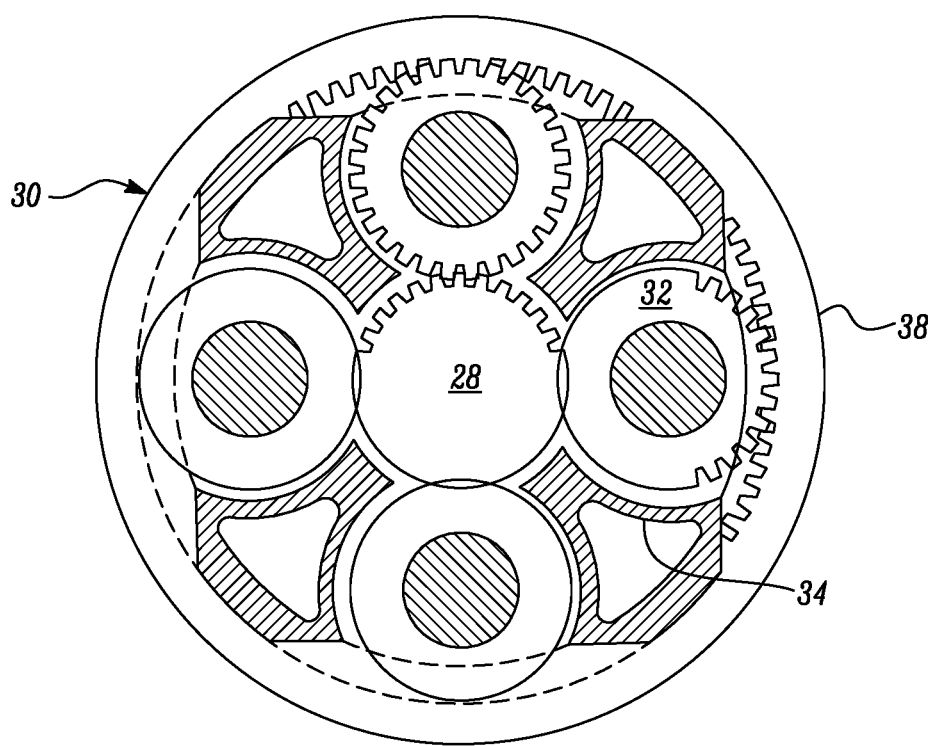
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
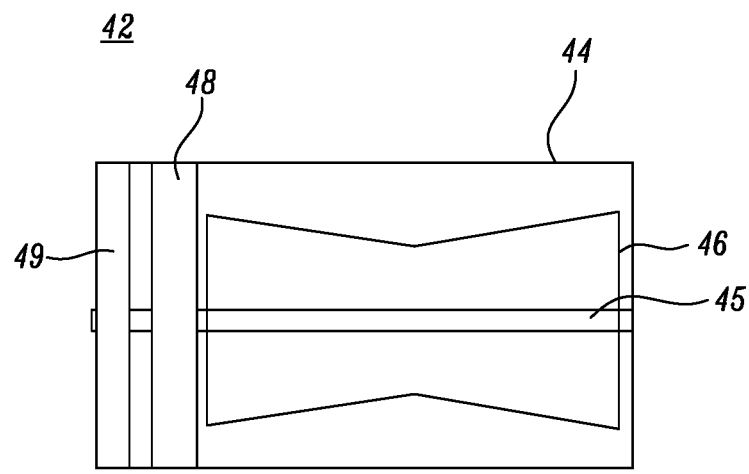
FIG. 4 schematically shows a sectional side view of a second example gas turbine engine.

FIG. 4 shows a sectional side view of a second example gas turbine engine 42. In this example, the gas turbine engine 42 comprises a fan casing 44 enclosing an engine core 46. A fan 48 is disposed upstream of the engine core 46 in a similar manner to the fan 23 in the first example gas turbine engine 10. A front frame 49 is disposed upstream of the fan 48 in an air intake of the gas turbine engine. The front frame 49 is configured to transfer the loads across the air intake from an axis 45 about which the fan 48 rotates, to the fan casing 44.

Figure 5:
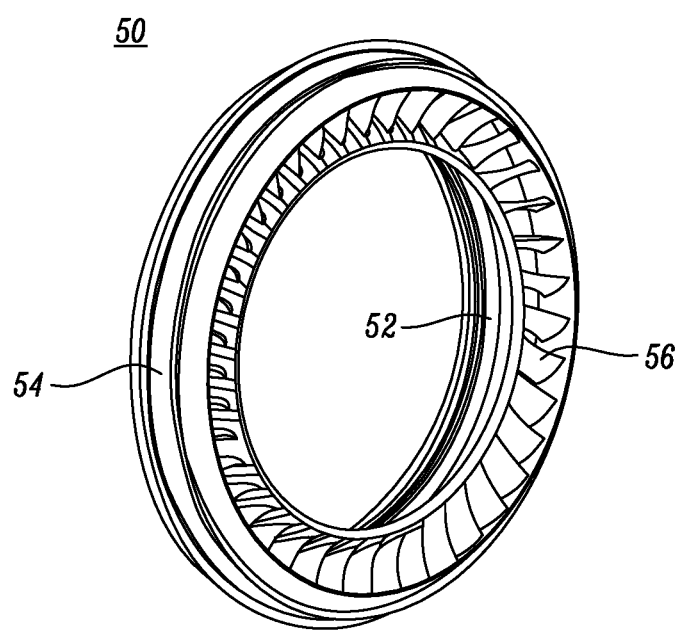
FIG. 5 schematically shows a perspective view of an integral composite stator vane ring.

FIG. 5 shows a fibre reinforced composite stator vane ring 50. In this example, the stator vane ring is also known as an engine stator section (ESS) for a core inlet of the gas turbine engine 10, 42. In other examples, the stator vane ring may be an outlet guide vane ring, an outer ring of an intermediate case or a front frame. The stator vane ring 50 in this example is disposed behind (i.e. downstream of) the fan 23 in a core inlet of the engine, and is configured to provide a structural load path across the engine core 11 (i.e. between a core body of the core 11 which is radially inward of a core annulus of the engine core and the core fairing). The stator vane ring 50 may be installed in a core engine such as that described above with respect to FIGS. 1-3 in the position of the structural support 24 (i.e. within the core inlet). Structural loads may then be transmitted from the core fairing to the nacelle 21 by a load path across the bypass duct 22, such as the outlet guide vanes (OGVs). The stator vane ring 50 is therefore configured to withstand loads of operating torque and lateral loads. References herein to a stator vane ring being disposed in the core inlet are intended to mean that the stator vane ring is the most upstream structural component within the core annulus defined between the core body and the core fairing. The stator vane ring 50 comprises an inner annulus 52, an outer annulus 54 which is concentric with the inner annulus 52, and a plurality of stator vanes 56 disposed between and attached to the inner annulus 52 and the outer annulus 54. The plurality of stator vanes 56 are evenly distributed around the circumference of the inner annulus 52 and the outer annulus 54.

Figure 6:
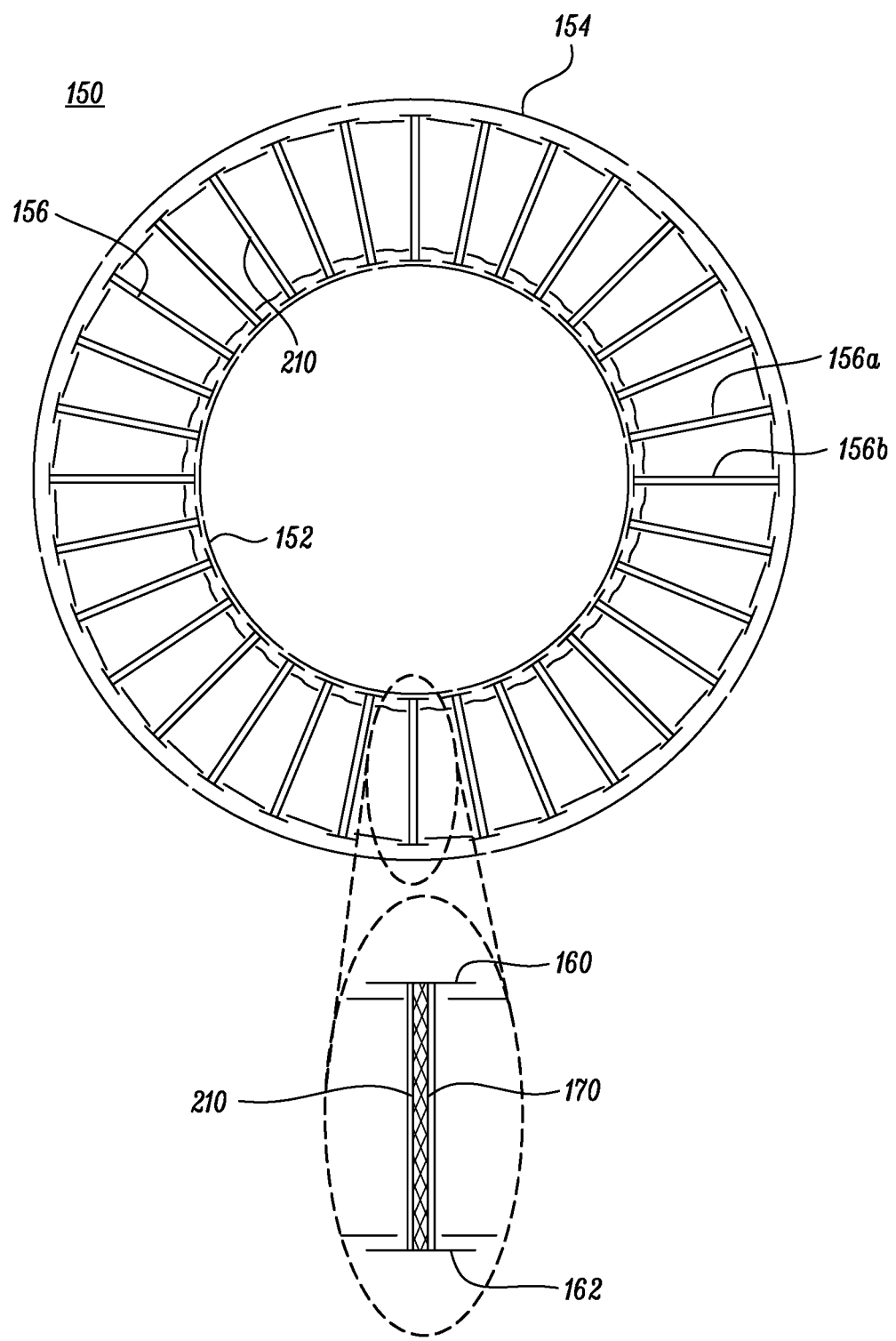
FIG. 6 schematically shows a cross sectional view of a stator vane ring preform.

FIG. 6 shows a cross sectional view of a stator vane ring preform 150. In this example, the stator vane ring preform 150 is configured to form the stator vane ring 50 when cured. In other examples, the stator vane ring 50 may be assembled from individual composite vanes 56 or sets of vanes which have already undergone curing.

The stator vane ring preform 150 comprises an annular inner annulus preform 152, an annular outer annulus preform 154 and a plurality of vane preforms 156 disposed between the inner annulus preform 152 and the outer annulus preform 154. The inner annulus preform 152 corresponds to the inner annulus 52 of the stator vane ring 50, the outer annulus preform 154 corresponds to the outer annulus 54 of the stator vane ring 50, and the plurality of vane preforms 156 correspond to the plurality of vanes 56 of the stator vane ring 50.

The vane preforms 156 are hollow, such that they define interior hollows or cavities 210. The hollow vane preforms 156 also comprise bifurcated ends at a radially inner end, and at a radially outer end of each vane preform 156. The bifurcated ends of the vane preforms 156 define a pair of inner flanges 160 at the radially inner end, and a pair of outer flanges 162 at the radially outer end of the vane preform 156, such that the vane preform 156 defines an I-section in cross-section. The stator vane ring preform 150 may comprise empty hollow vane preforms 156a and/or hollow vane preforms 156b which contain a damping material and/or a rod 218 inside the hollow 210. After curing, the empty hollow vane preforms 156a will form the empty hollow vanes 56a, and the hollow vane preforms 156b will form the hollow vanes 56b, which are described below with reference to FIG. 7.

Figure 7:
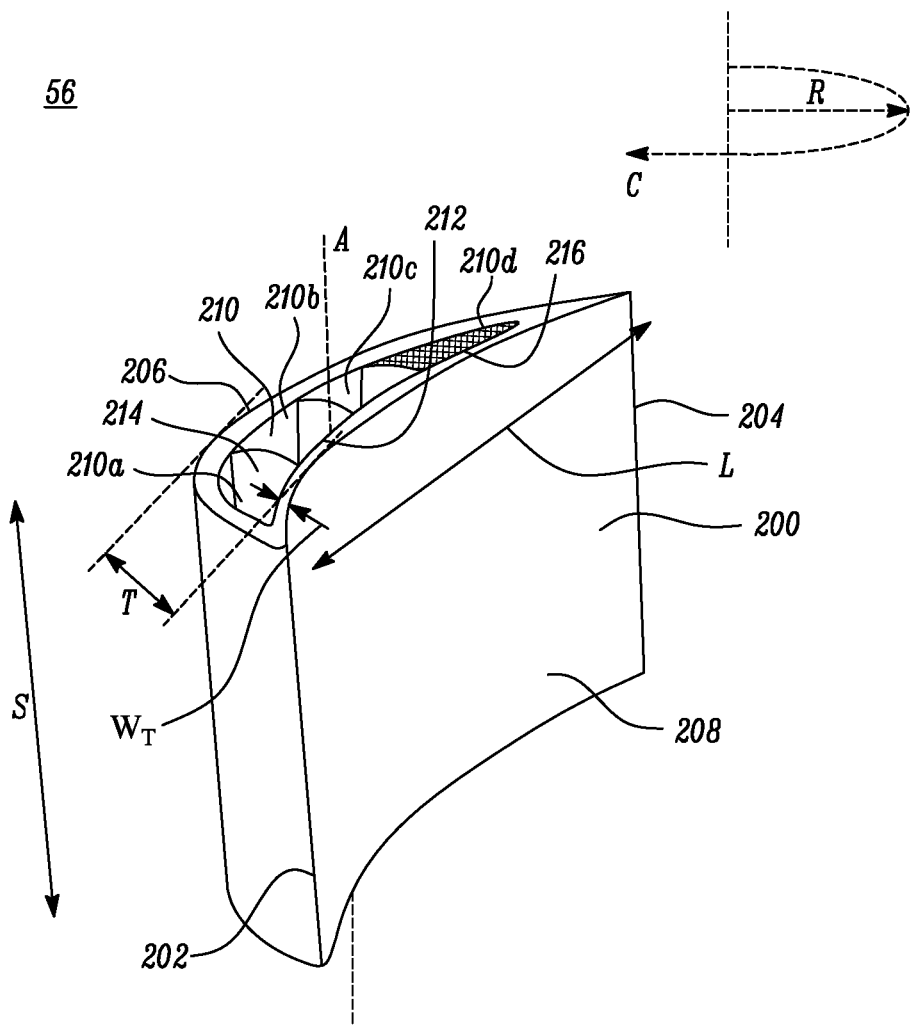
FIG. 7 schematically shows a cross sectional view of a vane in accordance with the present invention.

A single stator vane 56 according to the present invention is shown in FIG. 7. Although a single vane 56 is shown here for reference, it will be understood that vanes 56 according to the present invention can be manufactured in a set comprising two, three or more vanes 56 integral with each other or as an integral stator vane ring, as described above. It will be understood that the single vane 56, or a set of vanes 56 may be formed integrally with flanges (as shown in FIG. 6), so as to enable the assembly of the vanes into the stator vane ring 50. Although in this example the vanes 56 are described herein with reference to a stator vane ring 50, it will be appreciated that the vanes 56 are suitable for use in any engine cartwheel structure through which oil, hydraulic, or electrical services may pass.

The vane 56 is formed in the shape of an aerofoil comprising an outer surface 200 defining a leading edge 202, a trailing edge 204, a suction surface 206 and a pressure surface 208. The vane 56 comprises a hollow core 210, defined by an inner surface 212 of the vane 56. The vane 56 has a span S, a chord length L (from the leading edge to the trailing edge) and a thickness T. A wall thickness $W_T$ is defined between the inner surface 212 and the outer surface 200 in a direction normal to the outer surface ($W_T$)

In this example, the wall thickness $W_T$ varies circumferentially around the hollow core, and also along the span S of the vane 56. It will be understood that in other examples, the vane can have a constant wall thickness $W_T$. In this example, the vane has a maximum thickness T of 35 mm and a maximum wall thickness $W_T$ of 2.4 mm. It will be appreciated that a small segment of the vane 56, towards the trailing edge 204, will not have a wall thickness according to the above definition and so is not considered, since a distance normal to the outer surface would not intersect the inner surface.

The vane 56 defines a spanwise axis A, which extends through the hollow core 210. The foregoing description uses a polar coordinate system defined about the axis A, with a circumferential (angular) component C and a radial component R.

Figure 8:
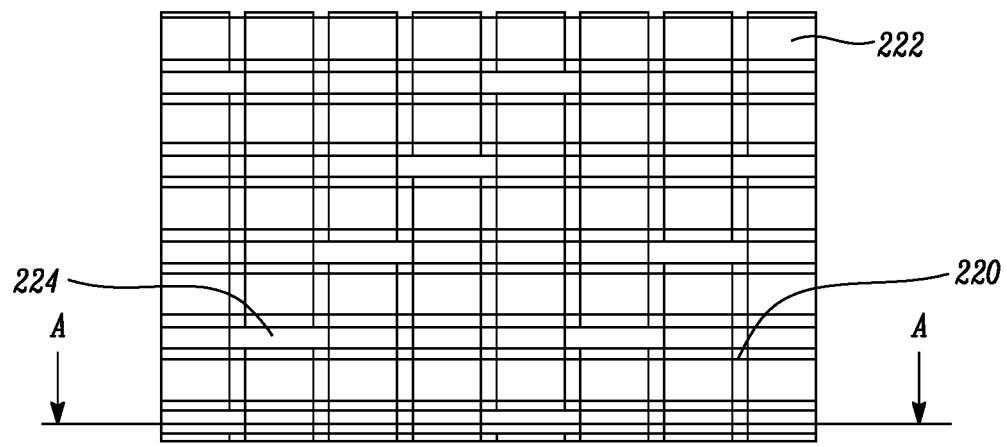
FIG. 8 schematically shows an example three-dimensional woven fibre structure.
Figure 8:
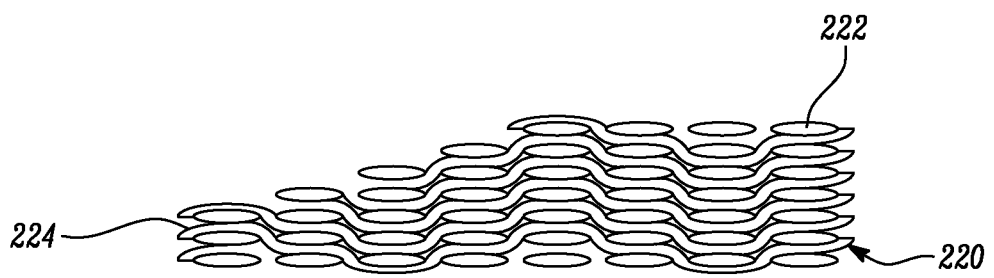

The vane 56 is formed from a composite material comprising reinforcing material (fibres) in a matrix material. The fibres are arranged in a three-dimensional (3D) woven structure, an example of which is shown in FIG. 8. The 3D woven structure comprises a tri-axial weave of fibres in the x, y and z direction. These fibres can be termed warp 220, weft 222 and z-binder 224 fibres respectively. In the weaving process, the warp fibres 220 are held in tension in a first direction referred to herein as the x direction, whilst the weft fibre 222 is inserted over and under the warp 220 in an orthogonal second direction, referred to herein as the y direction. The z-binder fibres 224 are also woven in a third direction through the thickness of the warp 220 and weft fibres 222 which is orthogonal to the x direction and the y direction, referred to herein as the z direction. In a 3D woven structure, the z-binder 224 fibres hold each layer of warp 220 and weft 222 fibres together, increasing the interlaminar strength of the composite once cured. The specific architecture (or interlacing pattern) of the fibres, particularly the z-binder 224 fibres, can be tailored so as to achieve the desired mechanical properties of the vane 56. In this example, the preferred architecture is layer to layer weaving, but the other architectures, such as through-thickness angle interlock, may be used.

In this example, the warp fibres are arranged to extend along a spanwise direction of the vane (i.e. parallel to axis A, as shown in FIG. 7). The weft fibres are arranged to extend orthogonally with respect to the warp fibres, such that they extend along a circumferential direction around the hollow core (e.g. circumferentially around a spanwise axis A of the vane disposed within the hollow core). It will be appreciated that in the context of an airfoil (rather than a cylinder, for example) the circumferential component is aligned with the wall of the airfoil rather than being orthogonal to the radius at all points. The z-binder fibres extend through the thickness of the vane 56. The presence of the z-binder fibres provides the vane 56 with improved delamination resistance and toughness properties in the through-thickness direction. As such, hollow vanes 56 can be manufactured with a decreased wall thickness whilst providing enough structural support to enable the vanes 56 to be used in structural applications, such as the stator vane ring 50. The inventors have found that a stator vane can be manufactured with a ratio of wall thickness ($W_T$): thickness (T) of less than 0.1, whilst providing the requisite mechanical properties for carrying a structural load in the engine, whereas previous attempts to manufacture a stator vane to carry the structural load, whilst using a two-dimensional weave, resulted in vane geometries in which the maximum thickness was considerably higher, and/or in which the vane was solid rather than hollow. In addition, the vanes 56 will be able to withstand the necessary impact forces experienced during, for example, a bird strike, without failure. Having hollow vanes 56 can reduce the overall weight of the vanes 56 by as much as 50% over a traditional titanium or magnesium alloy vane, which therefore reduces the weight of the engine.

The ratio of the warp to weft fibres can be tailored according to the mechanical properties that are desired in specific directions. For example, the ratio of the warp to weft fibres can be greater than 50:50 (for example 60:40, or 70:30) such that there are more warp fibres (extending along a spanwise direction of the vane) than weft fibres (extending along a circumferential direction). By increasing the ratio of warp to weft fibres, the vane will have improved mechanical properties, such as improved strength, in the spanwise direction.

The fibres used in this example are carbon based fibres, in particular intermediate modulus and high strength fibres. The matrix used in this example is an organic polymer matrix. In other examples, the fibres could be ceramic-based and/or the matrix may be ceramic-based, such as silicon carbide fibres in a silicon carbide matrix, or aluminium oxide fibres in an aluminium oxide matrix.

In this example, dry fibres are woven into a preform structure, before infusing the preform structure with a matrix material (such as a resin), and subsequent curing to form the composite. The dry fibres are also treated with a binder in the form of a powder. It will be appreciated by the skilled person that in other examples, "pre-preg" fibres may be used, in which the fibres have been pre-impregnated with the resin. This removes the need for separate infusing of the resin after weaving of the fibres.

Figure 9:
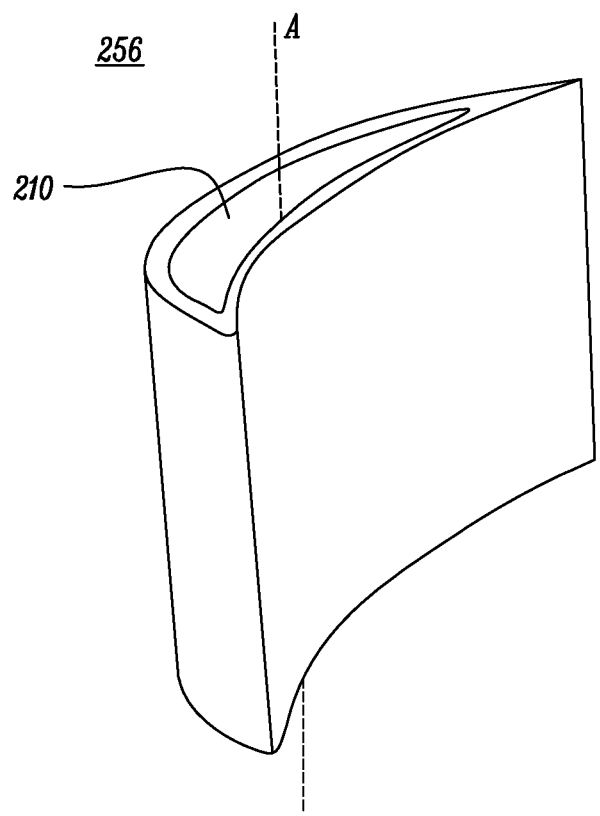
FIG. 9 schematically shows a cross sectional view of an alternative vane in accordance with the present invention.

In this example, the vane 56 comprises a plurality of webs 214, which separate the hollow core 210 into a plurality of hollow core regions 210a 210b 210c 210d. In other examples, such as the example vane 256 shown in FIG. 9 below, the hollow core 210 may comprise a single hollow core region 210a, or a single web 214 which divides the hollow core into two hollow core regions. In this example, the hollow core regions 210a 210b 210c 210d are different sizes but in other examples may be evenly sized. The specific design of the hollow core 210 can be tailored to the desired mechanical properties of the vane, using modelling methods. The hollow core regions 210a 210b 210c 210d are formed by preparing the preform structure around a mandrel (or mandrels), which may comprise a sacrificial material which can be removed after curing of the preform structure, as will be explained below.

As discussed above with reference to FIG. 6, the hollow core regions 210a 210b 210c 210d of the vane 56 can be empty to provide empty hollow vanes 56a. Empty hollow vanes 56a allow services, such as electrical wiring or oil, to pass through the stator vane ring 50 via the vanes 56a. Alternatively, some or all of the hollow core regions 210a 210b 210c 210d can be filled with a central core 216 of damping material 170, forming damping vanes 56b. The damping material 170 comprises a viscoelastic material, such that when the material is deformed it exhibits both viscous and elastic behaviour through the dissipation and storage of mechanical energy. Suitable damping materials would be a polymer blend, a structural epoxy resin and liquid crystal siloxane polymer.

One particular and preferred polymer blend comprises, per 100 grams: 62.6% Bisphenol A-Epochlorohydrin (Epophen resin ELS available from Borden Chemicals, UK); 17.2 grams Amine hardener (Laromin C260 available from Bayer, Germany); 20.2 grams of branched polyurethane (Desmocap 11 available from Bayer, Germany). This polymer blend is then mixed in a mass ratio of 1:1 with a structural epoxy resin, preferably Bisphenol A-Epochlorohydrin mixed with an amine-terminated polymer (e.g. Adhesive 2216 available from 3M).

It is desirable for the damping layer 62 to comprise a modulus of elasticity in the range 0.5-100 N/mm². For the polymer blend damping layer, the modulus is approximately 10 N/mm² and a Poisson's ratio is approximately 0.45.

In this example, the vane 56 comprises a metal rod or a pre-cured carbon rod 218, disposed within one of the hollow core regions 210a 210b 210c 210d (region 210d, in this example). The rod 218 may be located in an empty vane 56a or a damping vane 56b. The rod 218 may be located in a hollow core region 210a 210b 210c 210d which is otherwise empty or may be filled with a central core 216 of damping material. The rods 218 may be solid or hollow, and may improve stiffness locally in the vanes 56. The rods 218 may be provided at an angle to the spanwise axis A in order to provide stiffness in a desired direction. Hollow rods 218 can also be used as channels for fluid or electrical wiring.

In some examples, the vane may have a connector for connection to an oil line, so as to provide oil to or from the hollow core 210. This may provide a flow route for oil to a central bearing of the stator vane ring and to the core engine, without necessitating provision of a separate oil line that extends through a working portion of the core gas flow in a manner which disrupts the aerodynamics of the core gas flow.

Figure 10:
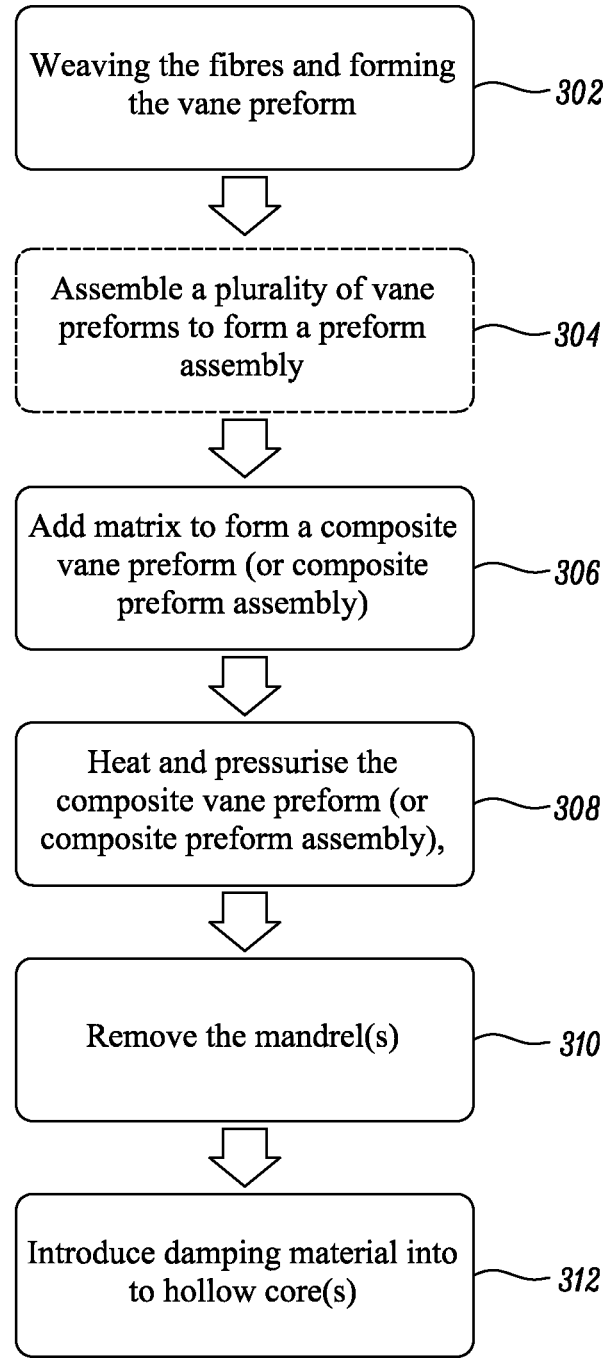
FIGS. 10 and 11 are flow charts showing steps of a method of manufacturing a vane comprising a three-dimensionally weave of composite material.

FIG. 10 is a flowchart showing steps of a method 300 for manufacturing a hollow vane 56 with a three dimensional weave. The method 300 begins with block 302, which comprises forming a vane preform 156 comprising the three dimensionally woven fibres. The fibres are woven into the desired 3D woven architecture in the x (warp), y (weft) and z (z-binder) directions. This process can be carried out on a conventional 2D loom or on a specialised 3D loom depending upon the desired architecture. The woven fabric is formed into the desired vane shape, around a mandrel (or mandrels), or around a piece (or pieces) of a sacrificial material, which can be removed later on in the manufacturing method 300, so as to form the hollow core region or regions 210 210a 210b 210c 210d. The sacrificial material can be a bismuth based alloy, for example, which has a melting point below approximately 230 degrees centigrade. In some examples, the sacrificial material may be water soluble, or may be an elastomeric bladder. A hollow rod 218 of pre-cured carbon fibre is introduced into the hollow core 210 210a 210b 210c 210d at a specific angle to the spanwise axis A in order to provide stiffness in a desired direction.

In this example, the fibre reinforcement material for the vane preforms 156 is dry fibre reinforcement material, treated with a binder in the form of a powder. In other examples, the fibre reinforcement material may be pre-impregnated with resin.

In block 304, the method comprises an optional step of assembling a plurality of vane preforms 156 around an inner annular preform 152, which comprises a lay-up surface upon which the vane preforms 156 are arranged. The plurality of vane preforms 156 are assembled so as to extend from inner annular preform 152 and are spaced apart around the inner annular preform 152. After arranging the vane preforms 156 around the inner annular preform, an outer annular preform 154 is arranged around the vane preforms 156, so as to form a preform assembly 150. This step enables the stator vane ring 50 to be manufactured as an integral component, but is not required if the vanes 56 are to be manufactured individually.

In block 306, the method comprises placing the vane preform 156 (or the preform assembly) into a mould, and adding the matrix into the mould to form a composite vane preform or composite preform assembly). It will be understood that this step is not required if pre-impregnated fibre reinforcement material is used.

Block 308 comprises placing the composite vane preform (or the composite preform assembly) and respective mould, into an autoclave, or otherwise heating and pressurising to cure the composite preform assembly. After curing, the vane is removed from the mould. The cured vane has a thickness T of 35 mm and a wall thickness $W_T$ of 2.4 mm or less.

Block 310 comprises removing the mandrel(s) or sacrificial piece(s) of material to reveal an empty hollow core 210 210a 210b 210c 210d. The sacrificial piece(s) of material can be melted or machined to be removed from the vane 56.

Block 312 comprises the step of introducing damping material, such as a viscoelastic damping compound into the hollow core 210 210a 210b 210c 210d.

Figure 11:
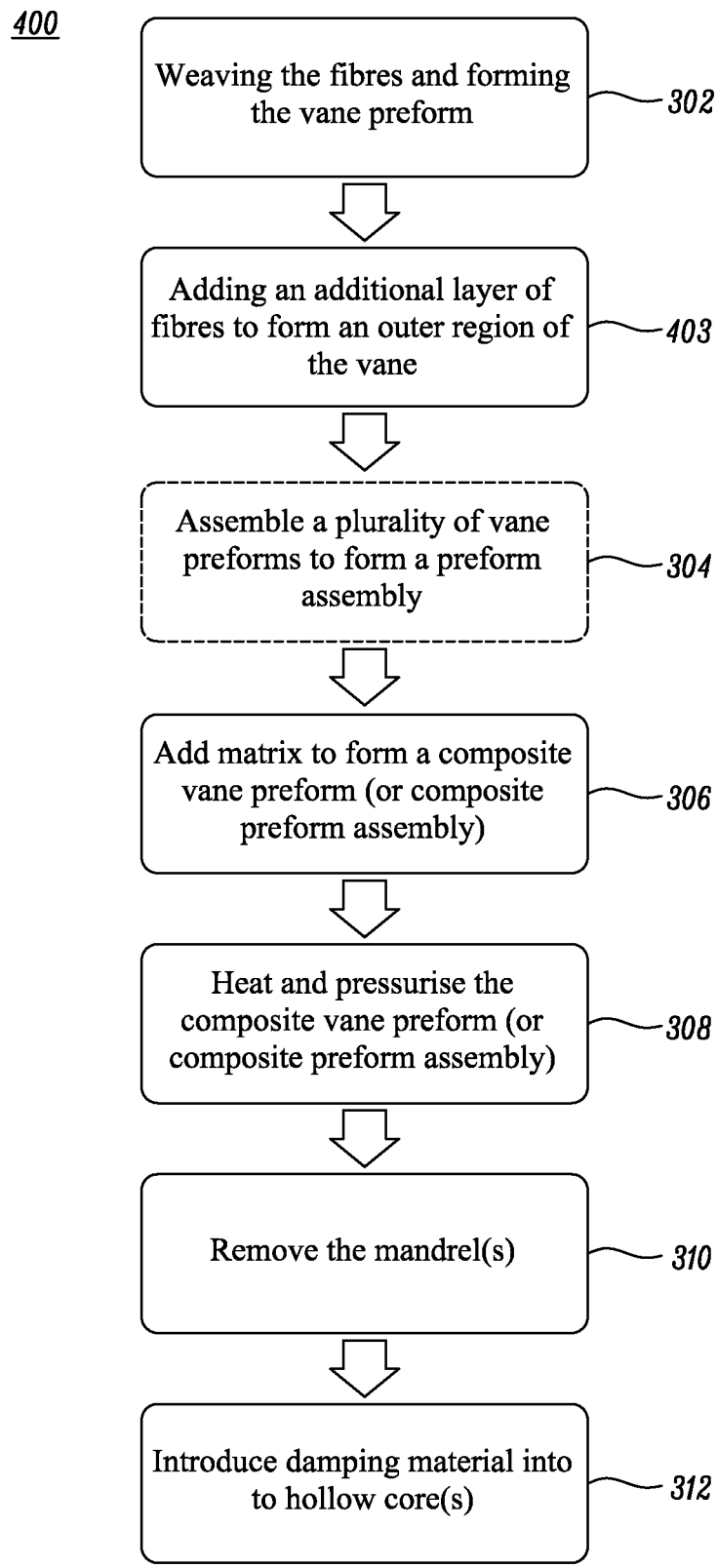
Figure 12:
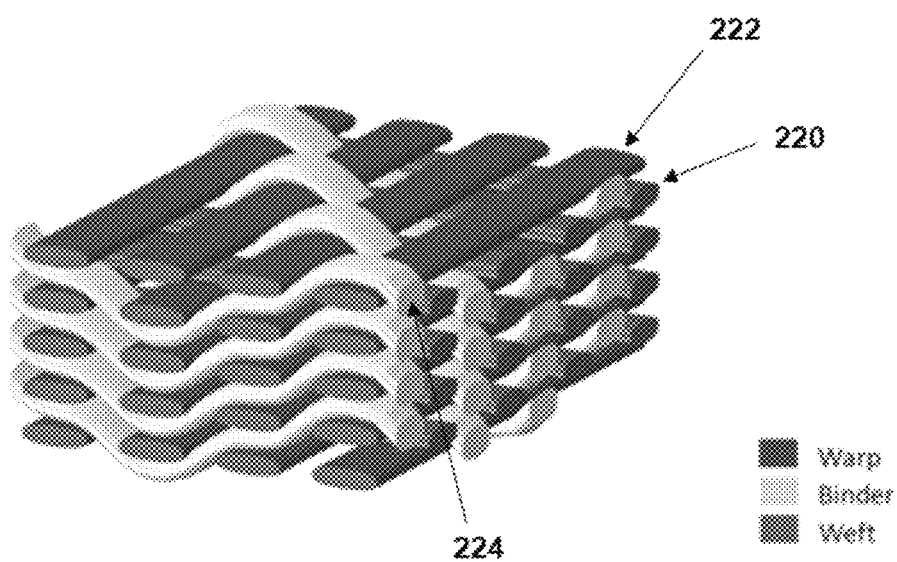
FIG. 12 is a perspective view of the example three-dimensional woven fibre structure of FIG. 8.

FIG. 11 is a flowchart showing steps of an alternative method 400 for manufacturing a hollow vane 56 with a three dimensional weave. The method 400 comprises each of the steps as shown in method 300 (FIG. 10, with like reference numerals according), with the addition of block 403. Prior to block 403, an inner region of a vane preform is manufactured in block 302 by weaving the fibres around a mandrel or mandrels. In block 403 the method comprises adding a layer (or a plurality of layers) of fibre reinforcement material to the inner region of the vane preform, wherein the additional fibre reinforcement material forms an outer region of the vane preform and is woven so as to differ from the weave of the inner region with respect to at least one weave parameter.

In one example, the different weave parameter can be a weave dimensionality, namely two dimensional or three dimensional. For instance, the outer region may be formed by the application of a two-dimensional ±45° woven fabric to the inner region. The outer region may help to protect the inner region from impact damage, and/or may help to reduce torsional displacement. Alternatively, the outer region may comprise two-dimensional unidirectional plies, and/or a two-dimensional braided preform could be fitted over the inner region. An erosion coating, such as a film-based layer, or an overmoulded thermoplastic, could then be applied over the top.

In another example, the different weave parameter can be a three-dimensional weave architecture. For instance, the outer region may comprise through-thickness angle interlock woven fibre reinforcement.

In a further example, the different weave parameter is a length of the woven fibres. For instance, the fibres applied in the outer region may be longer than those applied in the inner region.

Alternatively, a ratio of warp to weft fibres could differ between the inner region and the outer region. For instance, a ratio of warp to weft fibres may be lower in the outer region than in the inner region.

In another example, an angle of the warp fibres to a spanwise axis of the vane may be different between the inner and outer region. For instance, the inner region may comprise warp fibres substantially aligned with the spanwise axis, and the outer region may comprise warp fibres which are not aligned with the spanwise axis.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A vane for a gas turbine engine, the vane comprising a three-dimensional weave of composite material, wherein the vane is hollow to define a hollow core, and wherein the vane has a maximum thickness (T), and a maximum wall thickness between an inner surface and an outer surface in a direction normal to the outer surface ($W_T$), wherein $W_T \leq 0.1T$, wherein the three-dimensional weave comprises:
  a plurality of warp fibres which each extend along a first direction which is within 5 degrees of a spanwise direction of the vane between a root and a tip of the vane, wherein the plurality of warp fibres are grouped into layers of coplanar warp fibres;
  a plurality of weft fibres which are grouped into layers of coplanar weft fibres, wherein each layer of coplanar weft fibres extends between successive adjacent layers of coplanar warp fibres, wherein each weft fibre of the plurality of weft fibres extends along a second direction orthogonal to the first direction, wherein each weft fibre extends around an entirety of the hollow core, and wherein each weft fibre is orthogonal to the warp fibres around an entirety of an extent of the weft fibre; and a plurality of z-binder fibres which extend through a thickness of the warp and weft fibres along a third direction orthogonal to both the first and second directions, each of the plurality of z-binder fibers is generally parallel to the plurality of warp fibres, and wherein the ratio of warp to weft fibres is greater than 50:50.

2. The vane as claimed in claim 1, wherein the hollow core defines a plurality of hollow core regions which are separated by webbing.

3. The vane as claimed in claim 1, wherein the vane comprises a damping material within the hollow core.

4. The vane as claimed in claim 1, wherein a metal or carbon fibre composite rod is provided within the hollow core.

5. The vane as claimed in claim 1, wherein the vane comprises a connector for connection to an oil line to provide oil to the hollow core.

6. A vane arrangement for a gas turbine engine, comprising an oil line configured to convey oil; and
the vane as claimed in claim 5, wherein the oil line is coupled to the connector to provide oil to the hollow core.

7. The vane as claimed in claim 1, wherein the composite material comprises a carbon fibre reinforcement material and/or an organic polymer matrix.

8. The vane as claimed in claim 1, wherein the vane comprises an inner region and an outer region, wherein at least one weave parameter differs between the inner region and the outer region, wherein the difference is in a length of the fibres.

9. A fibre reinforced composite stator vane ring for a core inlet, a bypass duct or an air intake of a gas turbine engine, comprising a plurality of the vanes as claimed in claim 1.

10. A gas turbine engine for an aircraft comprising:
an engine core comprising a turbine, a compressor, and a core shaft connecting the turbine to the compressor;
a fan located upstream of the engine core, the fan comprising a plurality of fan blades; and
wherein a core inlet, a bypass duct or an air intake of the gas turbine engine comprises one or more of the vanes as claimed in claim 1.

11. The gas turbine engine as claimed in claim 10, the engine core defining an annular flow path for a core gas flow between a core body and a core fairing, the engine core comprising the core inlet between the core body and the core fairing, wherein the stator vane ring is disposed in the core inlet and serves as a structural support for transferring loads between the core body and the core fairing.

12. The gas turbine engine as claimed in claim 11, further comprising:
a gearbox that receives an input from the core shaft;
wherein the gearbox receives input from the core shaft and outputs drive to the fan so as to drive the fan at a lower rotational speed than the core shaft;
wherein the gearbox is an epicyclic gearbox, and wherein an annulus or ring gear of the epicyclic gearbox is structurally supported by coupling to the stator vane ring.

13. The vane as claimed in claim 1, wherein the vane comprises an inner region and an outer region, wherein at least one weave parameter differs between the inner region and the outer region, wherein the difference is in a ratio of warp to weft fibres.

14. The vane as claimed in claim 1, wherein a first layer of coplanar warp fibres includes a first, second, third, and fourth warp fibre extending parallel to each other, wherein a second layer of coplanar warp fibres arranged below the first layer of coplanar warp fibres includes a fifth, sixth, seventh, and eighth warp fibre extending parallel to each other, wherein the first, second, third, and fourth warp fibres are aligned with the fifth, sixth, seventh, and eighth warp fibres, respectively, wherein the plurality of z-binder fibres includes at least one z-binder fibre that includes a first portion that extends over the first warp fibre, a second portion that extends under the second warp fibre and over the sixth warp fibre, a third portion that extends under the seventh warp fibre, and a fourth portion that extends over the eighth warp fibre and under the fourth warp fibre.

15. A method of manufacturing a composite vane for a gas turbine engine, the method comprising:
forming a preform for the vane comprising a three-dimensional weave of composite material; and
curing the preform;
wherein the preform has a hollow core, and
wherein the cured vane has a maximum thickness (T), and a maximum wall thickness between an inner surface and an outer surface in a direction normal to the outer surface ($W_T$), wherein $W_T \leq 0.1T$, and
wherein the three-dimensional weave comprises:
a plurality of warp fibres which each extend along a first direction which is within 5 degrees of a span-wise direction of the vane between a root and a tip of the vane, wherein the plurality of warp fibres are grouped into layers of coplanar warp fibres;
a plurality of weft fibres which are grouped into layers of coplanar weft fibres, wherein each layer of coplanar weft fibres extends between successive adjacent layers of coplanar warp fibres, wherein each weft fibre of the plurality of weft fibres extends along a second direction orthogonal to the first direction, wherein each weft fibre extends around an entirety of the hollow core, and wherein each weft fibre is orthogonal to the warp fibres around an entirety of an extent of the weft fibre; and
a plurality of z-binder fibres which extend through a thickness of the warp and weft fibres along a third direction orthogonal to both the first and second directions, each of the plurality of z-binder fibers is generally parallel to the plurality of warp fibres, and wherein the ratio of warp to weft fibres is greater than 50:50.

16. The method of manufacturing a composite vane as claimed in claim 15, wherein the preform is formed around a core mandrel, and wherein the core mandrel is removed after curing of the preform, so as to form the hollow core.

17. The method of manufacturing a composite vane as claimed in claim 15, wherein a damping medium is introduced into the hollow core.

18. The method of manufacturing a composite vane as claimed in claim 15, wherein the preform comprises an inner region and an outer region, wherein at least one weave parameter differs between the inner region and the outer region, wherein the difference is in a weave dimensionality, namely two dimensional or three-dimensional.

19. The method of manufacturing a composite vane as claimed in claim 15, wherein the preform comprises an inner region and an outer region, wherein at least one weave parameter differs between the inner region and the outer region, wherein the difference is in a three-dimensional weave architecture including at least one of layer-to-layer weaving and through thickness angle interlock.

* * * * *